Aug. 27, 1963 P. E. TRITLE 3,101,805
TRACTION BELT CYCLE VEHICLE
Filed Oct. 26, 1961 2 Sheets-Sheet 1
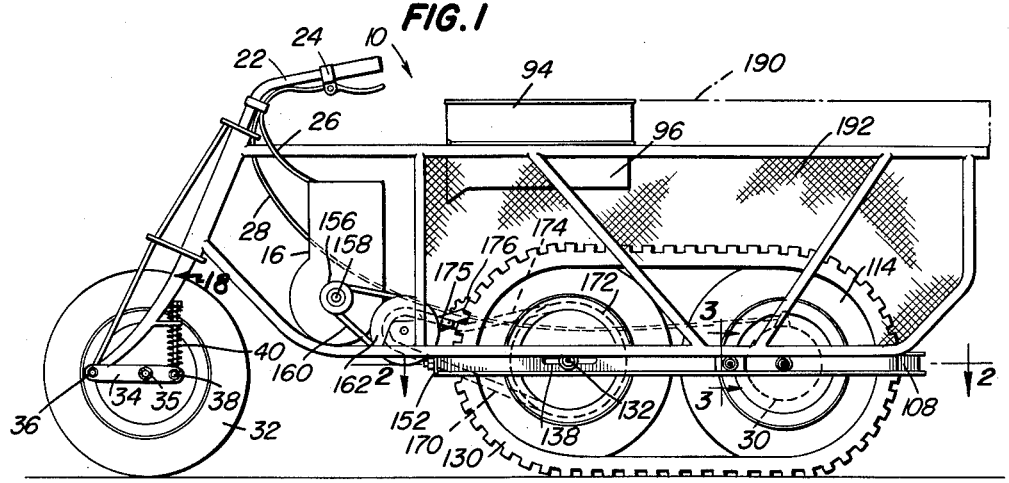
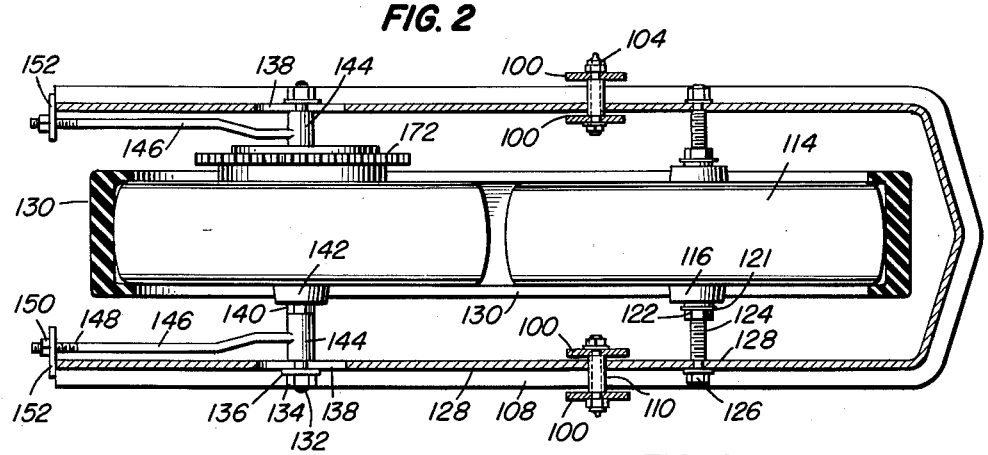
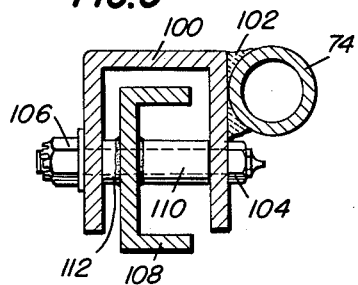
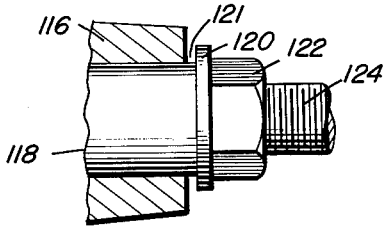
INVENTOR.
Paul E. Tritle
BY
ATTORNEY Aug. 27, 1963     P. E. TRITLE     3,101,805
TRACTION BELT CYCLE VEHICLE
Filed Oct. 26, 1961     2 Sheets-Sheet 2
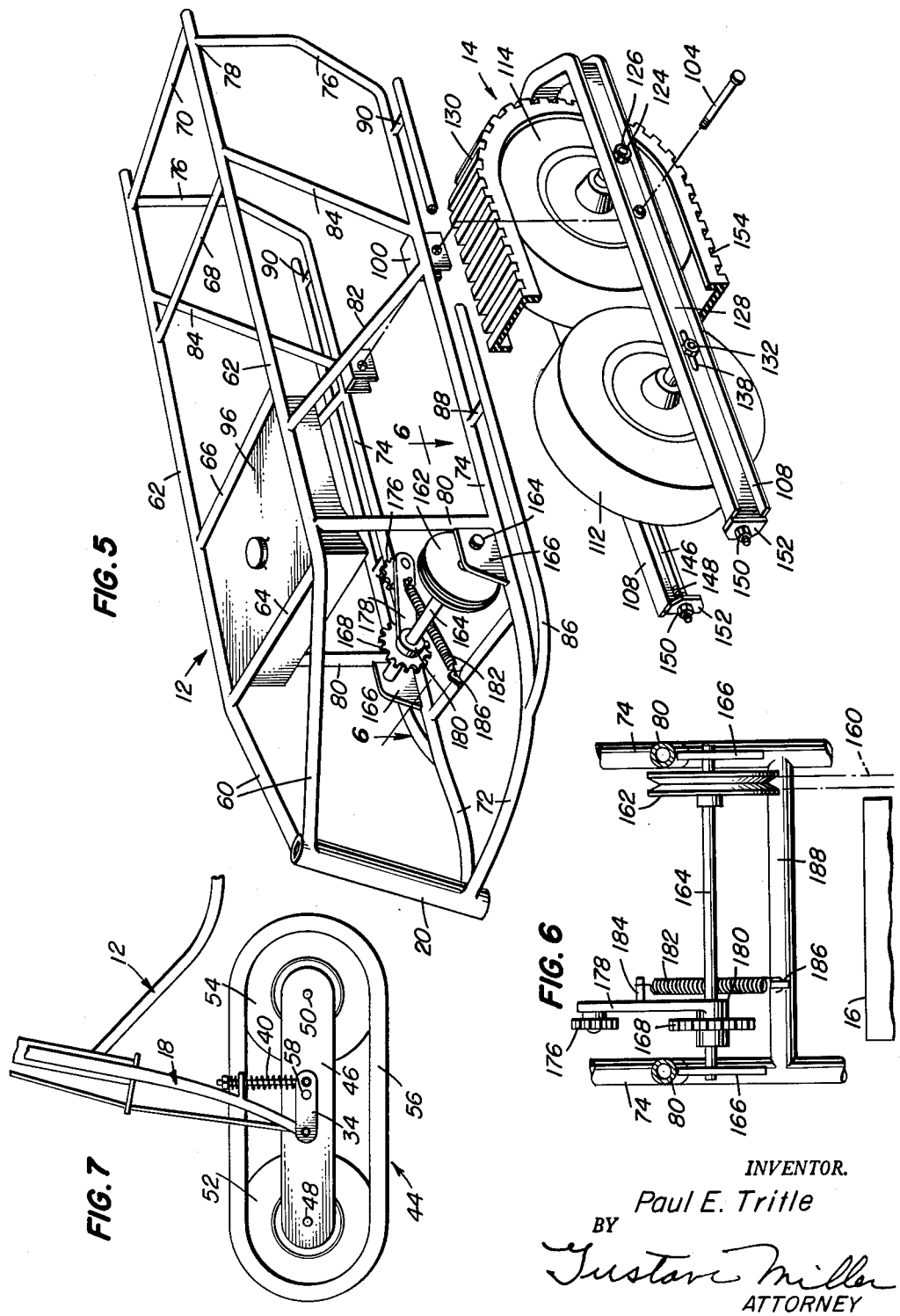
INVENTOR.
Paul E. Tritle
BY
Gustave Miller
ATTORNEY United States Patent Office 3,101,805
Patented Aug. 27, 1963

3,101,805
TRACTION BELT CYCLE VEHICLE
Paul E. Tritle, Salt Lake City, Utah, assignor to Mudd-Kat Corporation, a corporation of Utah
Filed Oct. 26, 1961, Ser. No. 147,823
6 Claims. (Cl. 180—9.24)

This invention relates to a traction belt cycle vehicle, and has for an object to provide a traction belt cycle vehicle that is versatile, compact, lightweight, and yet powerful enough to negotiate mountainous terrain, snow, mud, desert and any travel conditions that exist today.

A further object of this invention is to provide a traction belt cycle vehicle which is incapable of rearing over backwards when the vehicle encounters rocks, brush or other irregularities.

Still a further object of this invention is to provide a traction belt cycle vehicle wherein the traction belt is so designed and suspended from the vehicle fork that it has a tendency to climb up and ride on the surface when the surface is irregular, such as rocky or muddy, or is of snow or rough ice, and wherein the forward part of the wheel unit has the power applied to it at an angle forward and above the rear of the wheel unit.

Still a further object of this invention is to provide a traction belt cycle vehicle which has the necessary traction to go through mud, snow, sand, rocky or irregular terrain at better than a forty-five degree grade, due to the extremely large contact surface of the wheel units on the surface of the terrain.

Still a further object of this invention is to provide a pivotal support for the traction belt wheel units which acts as a shock absorber and permits a rocking motion of the wheel units relative thereto.

Still a further object of this invention is to provide a traction belt wheel unit having a pair of tandem spaced wheels about which extends a traction belt, and wherein the rear traction wheel inside of the belt is mounted for a limited amount of transverse movement on its axle within the belt so that it may automatically line up behind the forward wheel of the wheel unit and provide trouble-free operation at all times on any terrain.

Still a further object of this invention is to provide a traction belt cycle vehicle having all controls mounted on the handle bars and leaving both feet of the operator free, which is a necessity on traversing mountainous terrain.

Still a further object of this invention is to provide a traction belt cycle vehicle capable of full power on low speed while on difficult roads of mud or snow, and capable of substantially higher speeds on smooth surfaces such as on paved roads, or the like.

With the above and related objects in view, this invention consists in the details of construction and combination of parts as will be more fully understood from the following description, when read in conjunction with the accompanying drawings, in which:

FIG. 1 is an elevational view of a traction belt cycle vehicle incorporating the principles of this invention.

FIG. 2 is a sectional view, on a larger scale, on line 2—2 of FIG. 1, particularly showing details of the traction belt wheel unit.

FIG. 3 is a sectional view on line 3—3 of FIG. 1, showing details of the wheel unit pivot means of the hanger on the rear frame.

FIG. 4 is a fragmentary detail view of the wheel hub and axle therefor, showing the transverse play of the hub on its axle, of the rear tandem wheel.

FIG. 5 is an exploded perspective view of the cycle rear frame and of the traction belt wheel unit.

FIG. 6 is a fragmentary sectional view on line 6—6 of FIG. 5, showing the power jack shaft and the power cable idler.

FIG. 7 is an elevational view showing a traction belt wheel unit substituted for the single wheel in the front fork of the cycle vehicle.

There is shown at 10 the traction belt cycle vehicle of this invention, consisting of a rear frame 12 in which is mounted for limited pivotal movement a traction belt wheel unit 14, which receives its power from a source of power consisting of any conventional internal combustion engine 16 mounted in the forward part of the frame 12. A front fork 18 extends through the tubular shaft 20 of the rear frame 12 and has mounted thereon the handle bars 22 to which is secured at 24 all the controls for the vehicle, including a throttle conduit 26 leading to the engine 16 and a brake cable conduit 28 for controlling a brake drum 30 on the rear wheel unit 14.

As shown in FIG. 1, a front wheel unit consisting of a single wheel 32 is mounted in the front fork 18 by means of a hanger means 34 pivoted to the front fork at 36 at one end and pivotally connected at 38 at its other end to a spring shock absorber 40 mounted at 42 on the fork 18, the wheel 32 rotating on axle 35 in hanger 34.

In FIG. 7, a front traction belt wheel unit 44 is shown as mounted on the front fork 18 in the same manner, but in this case, the hanger means 34 has pivoted thereon at 58 a larger hanger means 46 at each end of which there is journaled as at 48 and 50, the tandem wheels 52 and 54 about which extends the traction belt 56. This front traction belt wheel unit 44 is particularly intended for use when the traction belt cycle vehicle is to be used on ice or snow, particularly on rough trails where a large bearing surface is desirable, the details of the wheel unit 44 being substantially identical with the details of the rear wheel traction belt unit 14 and in general, the following description of the details of the rear traction belt unit 14 apply equally to the front traction belt unit 44. Obviously, by making the fork of suitable proportions, the traction belt wheel unit 44 may be made interchangeable with the single wheel 32 in the front fork 18 of the traction belt cycle vehicle 10.

It will be noted that the larger hanger means 46 of the front wheel unit 44 is pivoted on an axle 58 extending through the smaller hanger means 34. Thus, when it is desired to substitute the traction belt unit 44 for the single wheel 32, it is only necessary to remove the wheel 32 from the axle 35 and mount the traction wheel unit 44 on this axle 58, thus providing ready interchangeability of these two units on the front fork 18, as desired, the axle 58 being slightly longer than axle 35.

The rear frame 12 includes the forward or front tube or shaft 20 through which the stem of the front fork 18 extends, this tube 20 extending somewhat vertically, but at an angle suitable for the front fork pivoted therein. Flaring outwardly and rearwardly from the upper portion of the tube 20 are flaring portions 60 of upper tubular bars which then extend, as at 62, in parallel spaced apart relation in the same plane, and are provided with transverse tubular brace bars 64, 66, 68 and 70 between the parallel portions 62, these brace bars being in the same plane with the parallel portions 62.

At the bottom of the fork tube 20, there extends a pair of outwardly flaring and somewhat downwardly curved tubular bar portions 72 which then extend as parallel portions 74 in the same plane with each other and terminate in upwardly extending leg portions 76 secured adjacent the ends of the upper bar portions 62 at 78.

In the front end of the parallel portions, a vertical brace 80 connects each upper bar 62 to the lower bar 74 thereunderneath, and two additional braces 82 and 84, preferably at V-angles thereto as shown, serve to further connect the bar portions 62 and 74, which are correspondingly in the same vertical plane.

Secured to and flaring outwardly from each lower flaring portion 72 is another tubular bar portion 86 which curves somewhat outwardly and then parallel to the parallel bar portions 74 and in the same plane therewith, and are further secured thereto by connecting fingers 88 and 90, the bars 86 acting both as side bumpers and foot rests for the operator as well as for a passenger. The operator will sit on a seat 94 resting on the rectangle provided by the cross braces 64 and 66 and the portions of the upper parallel bars 62 therebetween, and underneath the seat 94, which is mounted for ready detachment, is provided a fuel tank 96 for supplying fuel to the engine or motor 16.

Welded to each of the bars 62, preferably in the position shown adjacent where the angular braces 82 and 84 are connected thereto, is an inverted pivot-receiving U-bracket 100, the U-bracket 100 being rigidly secured to the bars 74 as by welding 102 or the like, so as to have a very firm attachment thereto. Extending through the U-bracket 100 is a pivot pin 104 secured at its other end by a suitable nut 106. Pivotally mounted on this pivot pin 104 is a U-hanger 108 forming part of the traction belt wheel unit 14. This U-hanger 108 is substantially U-shaped as viewed in plan, and in addition, in order that it may have strength yet lightness, it is also shaped like a U lying on its side in cross section, as apparent from FIGS. 3 and 5. Bearing sleeves 110 and 112 may be secured, as shown in FIG. 3, to opposite sides of the vertical wall 128 of the U-hanger 108 at the point where the pivot pin 104 extends therethrough, both holding the U-hanger 108 in proper spaced relation to the pivot U-bracket 100.

Journaled in the U-hanger 108 in tandem relation to each other are a pair of traction wheels 112 and 114. The traction wheel 114 is the rear tandem wheel and its hub 116 is journaled on an axle 118 which has a collar or washer 120 held in place by a nut 122 on a threaded end neck 124 of the axle 118, the threaded end 124 being secured by a nut 126 through appropriate openings in the bight or vertical wall 128 of the U-hanger 108.

It will be noted, particularly in FIG. 4, that there is a space as at 121 between the end of the hub 116 and the washer 120. This space permits transverse movement of the hub 116 and its wheel on its axle 118, permitting the wheel 114 to automatically adjust itself behind driven wheel 112 within the traction belt 130 which passes about the tandem spaced wheels 112 and 114. The brake drum and mechanism 30 is mounted on this rear wheel 114 as illustrated in FIG. 1 (but omitted for clarity of illustration in the remaining figures).

The axle of the forward or driven wheel 112 has its threaded ends 132 secured by nuts 134 and washers 136 in a longitudinally extending slot 138 in the U-hanger vertical wall 128, the hanger wall 128 being spaced from the inner nut 140 on the axle against the front wheel hub 142 by a spacing sleeve 144 on one end of a tension bar 146 whose other end is threaded at 148 so that it may be adjustably secured by a nut 150 through an apertured ear 152 secured at the forward end of each leg of the U-hanger 108, as clearly apparent in FIG. 2. Obviously, when the nut 134 is loosened slightly on the axle end 132, the nut 150 will serve to adjust the position of the axle in its longitudinal slot 138 and thus suitably adjust the tension of the traction belt 130 on the wheels 112 and 114.

It will be observed, particularly from FIGS. 2 and 5, that the traction belt 130 is substantially U-shaped in cross section, thus permitting the tires of the wheels 112 to expand slightly under the weight of the vehicle and the operator, to completely fill the inside of the U-shaped traction belt 130 at the weight-bearing bottom portions, and thus provide increased and certain gripping contact between the wheels 112 and 114 and the traction belt 130.

A suitable traction tread 154 is provided on the outer surface of the traction belt 130.

The forward tandem wheel 112 is driven from the motor or engine 16 by means of a pulley 156 mounted on the engine shaft 158 and provided with a pulley cable 160 passing about a pulley wheel 162 secured on a jack power shaft 164 adjacent one end thereof, the jack power shaft 164 being journaled in bearing plates 166 supported on the rear frame 12 as by suitable welding or the like to the angle between the vertical braces 80 and the adjacent portion of the lower bars 74. Adjacent the other end of the jack shaft 164, there is provided a sprocket wheel 168 about which there passes a sprocket cable 170. The sprocket cable 170 also passes about a sprocket wheel 172 secured on the forward wheel 112 as shown in FIG. 2. The upper portion 174 of the sprocket cable 170 passes under the small idler sprocket wheel 176 which is journaled on the end of an idler finger 178, here shown as being pivoted at 180 on the jack shaft 164, a tension spring 182 being anchored at one end to an eye 184 on the idler finger 178 and at its other end to an eye 186 to a transverse brace bar 188 extending between the front ends of the parallel lower tubular bar portions 74.

Obviously, if desired, the finger 178 could be pivoted on a stationary pivot secured to the rear frame 12 or to either the brace 188 or the adjacent bar 74, instead of on the jack shaft 164. The idler sprocket 176 extending over the top of the upper sprocket cable portion 174 provides suitable tension on the sprocket cable 170. Inasmuch as the U-hanger 108 is pivoted to the rear frame 12 solely by the pivots 104, the traction belt wheel unit 14 will be free to pivot thereabout, but such pivotal movement is, of course, limited by the sprocket cable 170 passing about the sprocket wheel 172 on the driven wheel 112 and the sprocket wheel 168 on the power jack shaft 164. It will be also noted that the pivot 104 is located just a slight amount forwardly of the center line of the rear wheel 114, and substantially behind the center line of the front wheel 112. This permits limited pivotal movement of the unit 14, permitting its forward end to rock up and down as necessitated by rough terrain, and avoids causing the rear frame 12 to rear upwardly and over as it might otherwise do were this pivoting movement not present. This thus provides that the treads 154 on the lower surface of the traction belt 130 will hug and follow irregularities in the surface of the ground when it is rocky or sandy, as well as when it is muddy or snowy or icy, and a great area of traction surface is provided on the terrain.

In extremes of bad weather, particularly snow or ice, a similar traction belt unit 44 is substituted for the front wheel 32 as previously described. With both the throttle and brake controls mounted on the handle bars 22 as previously mentioned, the operator is at all times in full control of his vehicle, with his feet resting on the bars 86 and free to contact the ground whenever necessary, particularly in montainous terrain.

With a six-horsepower engine, this cycle vehicle is capable of low speeds of three miles per hour at full power, enabling it to climb grades of greater than forty-five degrees, and it is likewise capable of speeds up to thirty miles an hour or more, on level surfaces or roads. The pivotal movement of the traction belt rear unit 14 makes it impossible for rough surface to cause the vehicle 10 to rear upwardly and thus makes it a very safe vehicle for use on all kinds of surfaces, particularly mountain trails and narrow and rough paths where the usual cycle vehicle cannot be used. This rearwardly offset pivoting of the U-hanger 108 relative to the axle shafts 124 and 132 thus acts as a shock absorber on rough ground, and the space 121 between the rear wheel hub 116 and the washer 120 permits the rear wheel 114 to shift transversely as necessary to automatically follow the front driven wheel 112 and thus automatically lines up directly behind the front or driven wheel 112 to provide trouble free operation at all times on any terrain.

This traction belt cycle vehicle 10 will carry the operator on the seat 94 and a second attachable seat 190 may be added over the rear portion of the rear frame 12, as illustrated in dotted lines in FIG. 1, for one or two passengers who may likewise rest their feet on the bars 86, or this area can be used for carrying luggage or camp equipment, or game which has been shot on a hunting trip for which this vehicle is likewise particularly serviceable.

Suitable expanded metal side walls 192 are detachably secured to the sides of the rear frame 12, as illustrated in FIG. 1, to act as guards against the feet of the operator or passengers from becoming entangled in the wheel unit or the power transmission details. Obviously, while the pulley belt and sprocket cable have been disclosed in the power transmission, both cables could be sprocket cables with suitable sprocket wheels, or both cables could be pulley cables with appropriate pulley wheels, or the pulley cable and the sprocket cable could be interchanged, according to the desires of the manufacturer.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A cycle vehicle including a frame, a U-hanger pivotally mounted in said frame, a traction belt, a pair of wheels, means journaling said wheels in tandem relation in said U-hanger, said traction belt extending about said tandem wheels, pivot means pivoting said U-hanger to said frame, said pivot means being located in said U-hanger intermediate said wheel journal means therein, a power wheel journaled in said frame forward of said tandem traction wheels, a power receiving wheel fixed on the forward tandem traction wheel, a cable connecting said power wheel and power receiving wheel, said pivot means being located in said U-hanger relatively close to said journaling means for said rear tandem traction wheel and relatively remote from said journaling means for said forward tandem traction wheel, said cable limiting the pivoting movement of said U-hanger in said frame.

2. A cycle vehicle including a frame, a U-hanger pivotally mounted in said frame, a traction belt, a pair of wheels, means journaling said wheels in tandem relation in said U-hanger, said traction belt extending about said tandem wheels, pivot means pivoting said U-hanger to said frame, said pivot means being located in said U-hanger intermediate said wheel journal means therein, a power wheel journaled in said frame forward of said tandem traction wheels, a power receiving wheel fixed on the forward tandem traction wheel, a cable connecting said power wheel and power receiving wheel, said cable limiting the pivoting movement of said U-hanger in said frame, the journal means for the rear tandem traction wheel comprising a wheel hub, an axle shaft of slightly greater length than the thickness of said hub permitting said hub to move transversely on said axle as it rotates, and collar means on said axle limiting said transverse movement.

3. The cycle vehicle of claim 2, and means for adjusting the tandem spacing of said tandem traction wheels.

4. The cycle vehicle of claim 3, said adjusting means comprising tension bars adjustably connected to the forward tandem axle and to said U-hanger, said U-hanger having longitudinal slots in which said forward tandem axle is adjustably secured.

5. In a cycle vehicle, a rear cycle frame comprising a front tube extending somewhat vertically, a pair of upper frame bars and a pair of lower frame bars joined to said front tube adjacent its upper and its lower ends and flaring outwardly therefrom a distance and then rearward in parallel relation to each other, a plurality of spaced apart cross bars securing said upper frames together, a cross bar securing the forward ends of the parallel portions of the lower bars together, a plurality of brace bars securing each top bar to the lower bar therebeneath, pivot receiving means secured to each of said lower bars in alignment with each other, second bars flaring outwardly from the flared front portion of each lower bar, in the same plane with said lower bars, and then extending parallel to its lower bar in spaced relation thereto, and brace means securing each outwardly flaring second bar to its adjacent lower bar.

6. A cycle vehicle including a frame, a U-hanger pivotally mounted in said frame, a traction belt, a pair of wheels, means journaling said wheels in tandem relation in said U-hanger, said traction belt extending about said tandem wheels, pivot means pivoting said U-hanger to said frame, said pivot means being located in said U-hanger intermediate said wheel journal means therein but relatively close to said rear tandem traction wheel journal means and relatively remote from said forward tandem traction wheel journal means, a power wheel journaled in said frame forward of said tandem traction wheels, a power receiving wheel fixed on the forward tandem traction wheel, a cable connecting said power wheel and power receiving wheel, and a cable idler journaled on said fork and rotatively contacting said cable.

References Cited in the file of this patent

UNITED STATES PATENTS

| | | |
|---|---|---|
| 654,291 | Stith | July 24, 1900 |
| 889,678 | Hatfield | June 2, 1908 |
| 1,153,570 | Price | Sept. 14, 1915 |
| 2,243,124 | Rockola | May 27, 1941 |
| 2,323,526 | Eliason | July 6, 1943 |
| 2,445,058 | Fields | July 13, 1948 |
| 2,720,273 | Johnson | Oct. 11, 1955 |
| 3,001,599 | Fryar | Sept. 26, 1961 |

FOREIGN PATENTS

| | | |
|---|---|---|
| 39,543 | Norway | Aug. 18, 1924 |